2,749,853

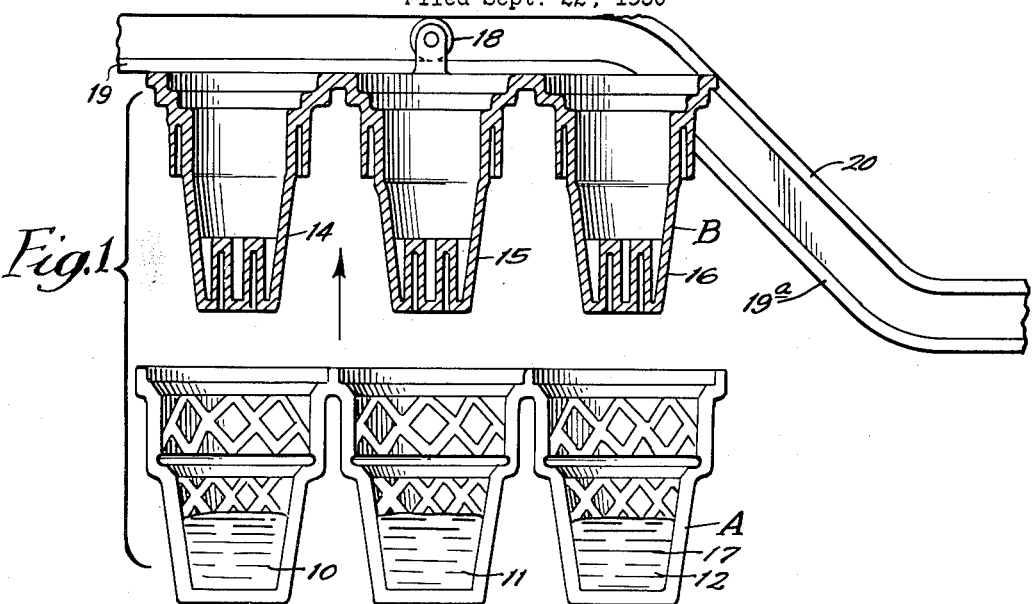
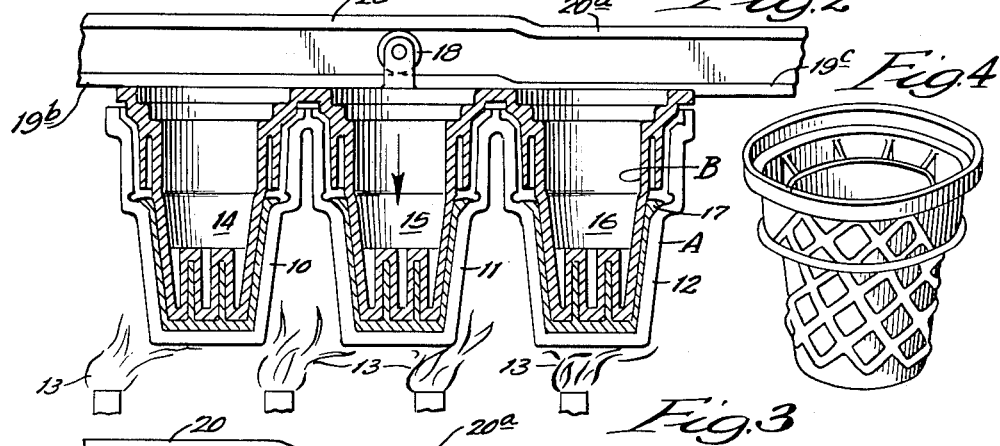
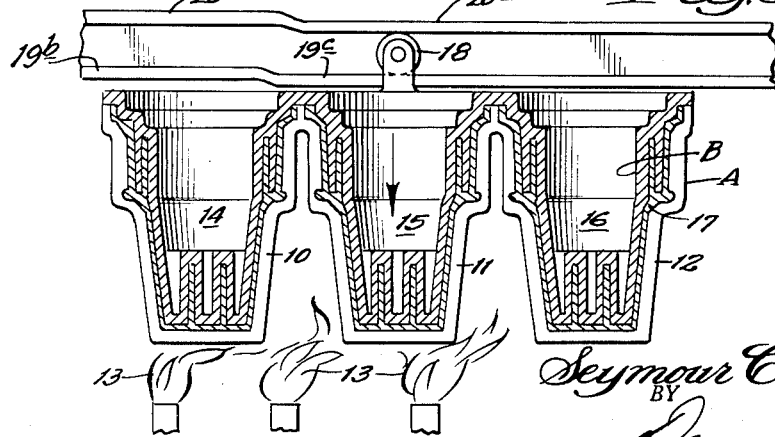

APPARATUS FOR MOLDING AND BAKING BATTER

Seymour C. Graham, Chicago, Ill., assignor to Illinois Baking Corporation, Chicago, Ill., a corporation of Illinois Application September 22, 1950, Serial No. 186,227

1 Claim. (Cl. 107—58)

This invention relates to the art of baking and particularly to continuous and high speed apparatus for molding and baking batter having a high shortening content.

In present continuous molding and baking machines, batter is usually introduced in desired quantity into the female cavity of a baking mold or in each of the female cavities if a multiple mold is employed. Soon after the batter is introduced, the male mold member is moved into the female mold member and then the two pass together through the baking cycle, followed by separation of the mold parts and delivery of the molded product prior to cleaning of the molds in anticipation of another cycle of operation.

In the past, after the batter had been introduced in the female mold cavity and before the batter had become heated throughout to baking temperature, the male and female mold parts were allowed to come together in molding relation. This closing of the mold parts caused the batter to partially fill the molding space and force the batter into more intimate contact with the heated mold surfaces so that the batter was quickly raised to baking temperature. The heating up of the batter brought about the rapid release of vaporizable constituents and the sudden build up of vapor pressure sufficient to force the batter to fill the mold space and even force the molds apart. In order to maintain the desired molding relation it was a practice of the industry to provide a barrier to the complete separation of the molds at this stage. Projections or other means were also provided to force the mold parts together to reestablish the desired molding relation. This successive up and down movement of the male mold member was intended to pump out the released gases and vapors so that the mold parts could thereafter be brought together more permanently to establish the desired molding relation while the content material was baking.

When baking with high shortening content batter—that is, batter having a shortening concentration ranging from 10 to 50 per cent by weight of the flour, such as is most desirable in the manufacture of ice cream cones which remain crisp longer after they have been baked, the up and down movement of the male mold member at this initial stage of the baking and molding cycle has the affect of tearing the side wall structure which has become partially baked and it encourages the formation of shortening blisters. An unattractive and unsuitable product results.

It is an object of this invention to provide new and improved apparatus for molding and baking batter to form molded products having a relatively thin wall section.

Another object is to provide apparatus for molding and baking high shortening content batter without formation of blisters or unattractive tears and wrinkles on the side walls.

A further object is to provide apparatus for molding and baking high shortening content batter in the manufacture of ice cream cones.

These and other objects and advantages of this invention will hereinafter appear, and for purposes of illustration, but not of limitation, an embodiment of this invention is shown in the accompanying drawing, in which:

Figure 1 is a schematic elevational view partially in section showing parts of the apparatus embodying features of this invention;

Figure 2 is an elevational view partially in section of the parts shown in Figure 1 in an advanced stage of the molding cycle;

Figure 3 is an elevational view partially in section of the elements shown in Figures 1 and 2 but in a still further advanced stage of the molding cycle; and Figure 4 is a perspective view of an ice cream cone produced by the mold parts shown.

It has been found that the formation of blisters can be substantially obviated and a uniform and attractive baked product secured if the mold parts are held in spaced relation through an initial portion of their travel through the baking cycle to enable gassing or the escape of large proportions of the volatiles from between the mold parts before they are closed to cause distribution of the batter by displacement instead of by steam pressure. When the mold parts are so held apart, the batter is not immediately forced to take the shape of the mold space. This is to be compared to the immediate filling of the mold space by steam pressure in the earlier process with the result that portions adjacent the heated metal faces will almost immediately commence baking and then become torn by the up and down movement of the mold parts.

In accordance with this invention, the mold parts are held apart or spaced, such for example as by $1/8-1/2$ inch away from complete closing, for sufficient time to permit heating up of the batter introduced in the mold cavity and volatilization of a large proportion of the vaporizable constituents. When the volatiles have gone off, the mold parts can be closed by their own weight. Volatilization thereafter occurs in such minor proportions that sufficient forces are not exerted to cause subsequent separation or relative movement of the mold parts. During final movement of the mold member toward fully closed position, the batter which is more viscous but still arranged in a pool within the cavity, is caused to flow by displacement to fill the mold space and thereafter is not disturbed until molding operations are complete.

It will be evident from this description that larger amounts of batter will have to be added in order completely to fill the mold space. Sometimes as much as 40 per cent more batter is required to fill the mold by this process than was required by prior processes. Thus, the molded product is well filled as compared to a product full of holes, blisters, and voids resulting from the elimination of volatiles after the baking process has started and the formation of steam in the prior systems.

The drawing illustrates the practice of this invention with a compound mold for baking ice cream cones of the cup type. It will be understood that the concepts of this invention may be applied with equal advantage to use in a single mold cavity and in molding other types of products, and even in the molding of and baking with normal batter.

The mold is formed of a female mold section A which may be of the two part type having three cavities 10, 11 and 12, and adapted to travel along a horizontal plane over flames 13 which heat up the mold parts to desired baking temperature while the molds are traveling through at least a portion of their cycle. The male mold part B having three mold members 14, 15 and 16 is guided through a portion of its travel so as to be raised in spaced relation with the female mold part while the baked product is being released from the mold, the mold parts cleaned and then batter 17 introduced in required amounts in each of the mold cavities 10, 11 and 12.

The male and female mold parts are connected through suitable means (not shown). The male mold member B is guided in its movement in the direction toward and away from the female mold part A by a laterally extending pin or roller 18 which rides on a guide rail 19.

After the batter 17 has been introduced into the cavities of the female mold, the mold parts continue to advance together through their cycle but the guide rail 19 is inclined downwardly, as illustrated by section 19ª in Figure 1, to permit the male mold part B to shift towards molding relation but the guide rail levels off for a short distance, illustrated by section 19ᵇ, to prevent the mold parts from completely closing, as shown in Figure 2. This spacing permits breathing for passage of volatiles from the batter. The length of the guide rail portion 19ᵇ at this level is sufficient to permit enough of the volatiles to be removed so that the mold parts can be subsequently closed without build-up of pressure to cause subsequent relative movement during the molding operation. In most instances, such as in the molding and baking of ice cream cones of the cup type, the rate of travel and length of raised rail section is calculated to provide a breathing time ranging from 1 to 4 second, depending upon the temperature of the molds and the type of batter.

In most instances it is adequate merely to make use of guide rail 19 on which the pin or roller 18 may ride. In order to insure the maintenance of the desired spaced relation and prevent any type of relative movement between the mold parts during this critical stage of the molding cycle, it is preferred to also make use of a top rail 20 in parallel spaced relation with the bottom rail 19 so that the roller or pin is fully guided therebetween during its movement through this portion of the baking cycle.

After the critical stage has been passed, the guide rails may drop, such as illustrated by sections 20ª and 19ᶜ in Figure 3, to permit complete closing of the molds. The mold will close and force the remaining batter by displacement to fill the mold space. The mold parts A and B may be locked together at this point or soon thereafter to prevent separation as the mold is turned upside down through the return portion of its cycle.

It will be apparent from this description that I have provided a new and improved apparatus for molding and baking batter in a manner to eliminate the presence of blisters and blow-holes and torn or disfigured surfaces in the molded product. This system is particularly adapted for the molding of high shortening content batter which is more sensitive to relative movement between parts during the initial stages of the molding operation and easily forms shortening blisters.

It will be understood that numerous changes may be made in the details of construction, arrangement and operation without departing from the spirit of the invention, especially as defined in the following claim.

I claim:

In a machine for baking batter having a high shortening content ranging from 10 to 50 percent by weight, the combination comprising male and female mold parts for defining a mold space movable along a predetermined path at substantially constant speed through a cycle of operation, means along said path for heating said mold parts, a roller connected to said male mold part, guide means operatively engaging said roller for controlling relative movement of said mold parts into and out of molding relation during the cycle of operation, said guide means including an initial guide section in the initial portion of the cycle for maintaining said male mold part separated sufficiently from said female mold part to enable batter to be introduced into said female mold part, said guide means also including a pair of spaced parallel guide rails following said initial guide section for confining said roller without substantial play, said rails being spaced a distance corresponding closely to the diameter of said roller, said rails having first inclined portions for moving said male mold part toward said female mold part, second elongated linear portions following said first portions for holding said male part without play from one-eighth to one-half inch short of full molding relation with said female mold part to permit release of moisture from the batter, third inclined portions following said second portions for shifting said male mold part into full molding relation with said female mold part, and fourth elongated linear portions following said third portions for holding said male mold part without play in full molding relation with said female mold part, said rails continuously engaging said roller and thereby positively preventing chattering of said male mold part relative to said female mold part.

References Cited in the file of this patent
UNITED STATES PATENTS

| | | |
|---|---|---|
| 1,302,733 | Turnbull | May 6, 1919 |
| 2,124,723 | Wharmby | July 26, 1938 |